H. KAPPER.
ROLLER BEARING CAGE.
APPLICATION FILED JAN. 15, 1915.

1,169,544.

Patented Jan. 25, 1916.

Witnesses:

Inventor:
Hermann Kapper,

UNITED STATES PATENT OFFICE.

HERMANN KAPPER, OF RATHENOW, GERMANY.

ROLLER-BEARING CAGE.

1,169,544.　　　　Specification of Letters Patent.　　Patented Jan. 25, 1916.

Application filed January 15, 1915. Serial No. 2,431.

*To all whom it may concern:*

Be it known that I, HERMANN KAPPER, a citizen of the German Empire, and residing at Rathenow, German Empire, have invented new and useful Improvements in Roller-Bearing Cages, of which the following is a full, clear, and exact description.

The present invention has reference to roller bearing cages, which consist of cage rings connected up by intermediary pieces, and has for its object to provide means in connection with the said rings for locating the rollers properly in alinement one with another and to provide a certain distance apart between the same in order to prevent friction.

According to the invention the cup-like bearings or guiding boxes consist of an auxiliary wave-like ring, to be placed into the ring of the roller bearing cage, which in turn is provided with recesses into which the waves or projections of the auxiliary ring engage.

In order to render the present invention more easily intelligible reference is had to the accompanying drawing in which—

Figure 1:
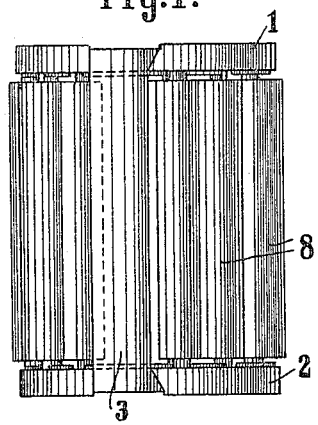
Figure 2:
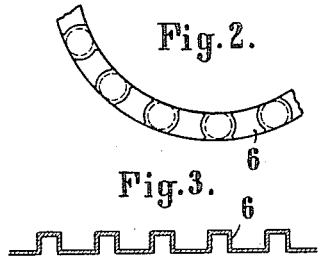
Figure 3:
Figure 5:
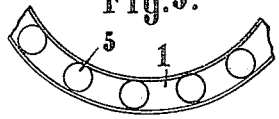
Figure 6:
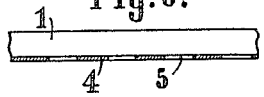
Figure 7:
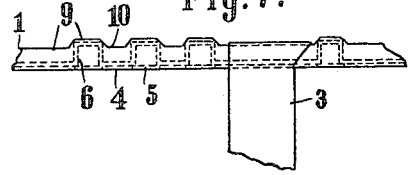
Figure 8:
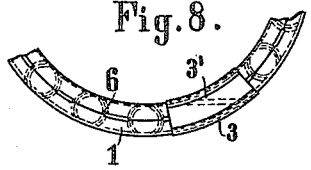
Figure 4:
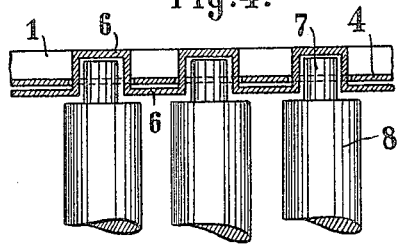

Figure 1 is a plan of a roller bearing with roller cage, Fig. 2 an upper view of the auxiliary ring, partly broken away, Fig. 3 a sectional view of the auxiliary, Fig. 4 partly section and partly plan showing the cage ring with the auxiliary ring put in, Fig. 5 a plan of a cage ring, partly broken away, Fig. 6 partly section and partly plan of the cage ring. Figs. 7 and 8 show in plan and upper view respectively the cage, into which the auxiliary ring is inserted from above.

1 and 2 are U-shaped cage rings and 3 are webs, connecting the said cage rings 1 and 2 one with another and insuring the proper distance apart between the same. The webs 3 are provided with projecting flanges 3' bent over and around the edges of the cage rings. The bottoms of the U-shaped cage rings possess holes for receiving the trunnions of the rollers. 6 are wave-like-shaped rings, embodied in such a manner that the waves form cup like bodies for the reception of trunnions 7 of the rollers 8.

According to Figs. 1 to 5 the wave-like shaped or auxiliary ring 6 is with the trunnions of the rollers inserted from below into the holes 5 of the cage ring.

Now according to the embodiment illustrated in Figs. 7 and 8 the auxiliary rings are inserted from above, so that the waves do not extend through the holes in the cage ring but the cups formed by the waves coincide with their openings with the holes in the cage ring. Accordingly the flanges or side walls of the cage rings 1 and 2 are so dimensioned that after the auxiliary rings 6 are put in, the said flanges or side walls may be bent around. As shown in Fig. 7 at 10 the bending around may be somewhat deeper between two waves of the auxiliary ring so that the same is prevented from displacement.

I claim as my invention:—

1. A roller bearing cage comprising in combination two U-shaped cage rings having perforated bottoms, auxiliary rings connected to said cage ring and provided with cup-like projections adapted to receive the trunnions of the rollers and coaxially disposed to the perforated bottoms of the cage ring, substantially as described.

2. In roller bearing cages the combination of U-shaped cage rings provided with a series of holes, auxiliary wave-like-shaped rings, the waves corresponding in number and shape to the holes in the cage rings, means for properly connecting up the cage rings, comprising means for fastening the connecting means to the cage rings and means for preventing the auxiliary from displacement in the cage ring.

3. In roller bearing cages the combination of U-shaped cage rings 1 and 2, having a perforated bottom 4 and side walls 9, webs 3 for connecting the cage rings, flanges 3' on the said web 3 to be bent over and around the said side walls 9, wave-like shaped auxiliary rings 6, to be inserted into the cage rings from above in such a manner that the open sides of the cups, formed by the waves, coincide with the holes in the bottom of the cage ring comprising means for securing the auxiliary ring against displacement in the cage ring.

In testimony whereof I affix my signature in the presence of two witnesses.

HERMANN KAPPER.

Witnesses:
　HENRY HASPER,
　WOLDEMAR HAUPT.

Copies of this patent may be obtained for five cents each, by addressing the "Commissioner of Patents, Washington, D. C."